United States Patent
Kim et al.

(10) Patent No.: US 10,048,433 B2
(45) Date of Patent: Aug. 14, 2018

(54) FLAT PANEL LIGHTING APPARATUS

(71) Applicant: R.F.TECH CO., LTD, Yongin-si (KR)

(72) Inventors: Min Chul Kim, Gwangju-si (KR);
Jung Hoon Kim, Gwangju-si (KR);
Dong Pil Choi, Suwon-si (KR); Min Wook Kwon, Yongin-si (KR); Hyun Joong Kim, Anyang-si (KR); Jun Jea Park, Suwon-si (KR); Jun Young Ko, Yongin-si (KR)

(73) Assignee: R.F.TECH CO., LTD, Yongin-Si (KR)

( * ) Notice: Subject to any disclaimer, the term of this patent is extended or adjusted under 35 U.S.C. 154(b) by 0 days.

(21) Appl. No.: 15/489,625

(22) Filed: Apr. 17, 2017

(65) Prior Publication Data
US 2017/0299801 A1     Oct. 19, 2017

(30) Foreign Application Priority Data

Apr. 18, 2016  (KR) .................... 10-2016-0046757

(51) Int. Cl.
*F21V 7/04*     (2006.01)
*F21V 8/00*     (2006.01)
*F21S 8/04*     (2006.01)

(52) U.S. Cl.
CPC .......... *G02B 6/0083* (2013.01); *G02B 6/0051* (2013.01); *G02B 6/0055* (2013.01); *G02B 6/0088* (2013.01); *F21S 8/04* (2013.01)

(58) Field of Classification Search
CPC .. G02B 6/0011; G02B 6/0051; G02B 6/0055; G02B 6/0073; G02B 6/0081; G02B 6/0083; G02B 6/0086; G02B 6/0088
USPC ......... 362/602–603, 612, 615, 630–634, 812
See application file for complete search history.

(56) References Cited

FOREIGN PATENT DOCUMENTS

| KR | 20-2010-0009061 U | 9/2010 |
| KR | 20-0469007 Y1 | 9/2013 |
| KR | 10-2015-0059685 A | 6/2015 |

*Primary Examiner* — Jason Moon Han
(74) *Attorney, Agent, or Firm* — Goldilocks ZONE IP Law

(57) ABSTRACT

A flat panel lighting apparatus, which makes it easy to replace a circuit board with LEDs thereon, is provided. The flat panel lighting apparatus includes a backplate, a driving unit, a light guide plate, a frame, a bracket, a circuit board, a connector and a cable connecting the driving unit and the circuit board. The frame with an opening portion is disposed at an outer periphery of the backplate and the light guide plate. The bracket is detachably coupled to the opening portion of the frame. The circuit board with light sources, is disposed in a space between the frame and the light guide plate, and is replaceable in a sliding type through the opening portion of the frame when the bracket is decoupled from the frame. The connector has a female terminal attached to the circuit board and a male terminal detachably coupled to the female terminal.

9 Claims, 3 Drawing Sheets

FLAT PANEL LIGHTING APPARATUS

CROSS REFERENCE TO RELATED APPLICATION

This application claims priority from and the benefit of Korean Patent Applications No. 10-2016-0046757, filed on Apr. 18, 2016, which is hereby incorporated by reference for all purposes as if fully set forth herein.

BACKGROUND OF THE INVENTION

Field of the Invention

The present invention relates to a flat panel lighting apparatus, more specifically to a flat panel lighting apparatus with an LED as a light source.

Discussion of the Background

There is a growing interest in eco-friendly energy as the energy consumption increases worldwide. In particular, energy consumed by lightings accounts for about 20% of the energy consumed in buildings. As a result, LEDs (Light Emitting Diodes), which are highly efficient, eco-friendly lighting fixtures, are in the spotlight. The LED lighting has a longer life span than conventional incandescent lamps or fluorescent lamps, consumes relatively low power, and is in the explosion of demand due to the fact that it does not emit pollutants in the manufacturing process.

Current LED lamps use color temperature of more than 7000K in China, and use also has high color temperature of 6200K~6500K in Kora. However, the color temperature of a daytime sunlight is 5400~5700K, and when using the temperature of blue light which is higher than sunlight, eyes become easily tired. In fact, a temperature of 5700K is known to be the most comfortable temperature for human eyes. In addition, the interest in color therapy has increased, and various colors are being demanded in the home. As a result, demand for low-temperature lighting is also increasing.

In general, in order to produce colorful illumination, a separate cover with a color, a transparent plate with a color and the like have been used. However, such a lighting lamp has a limitation in producing a variety of lights close to natural colors only with a cover or a translucent plate to which a color is added. In recent years, various attempts have been made to overcome these limitations by using LED light sources to produce various lighting. However, in the case of a conventional LED light fixture, when the life of the LED comes to an end or when a failure occurs, the entire LED light fixture must be replaced, so that an increase in maintenance cost cannot be avoided. Therefore, there is a problem that it is not economical to pursue diversity.

In addition, it is pointed out that the operation is troublesome when the components of LED lighting are replaced. In the case of an LED lighting installed on the ceiling, it is necessary to disassemble and to assemble the components by the worker, while the LED lighting installed on the ceiling, which poses a problem that safety of the worker may be threatened. In addition, the LED lighting device is characterized by a long lifetime. However, the conventional LED lighting device has a limitation that it cannot be changed according to the customer's sensibility or demand, and it can only be used in a fixed manner until its life is over.

SUMMARY OF THE INVENTION

Therefore, the technical problem of the present invention is to provide a flat panel lighting apparatus which makes it easy to replace a circuit board on which a plurality of LEDs are mounted thereon.

A flat panel lighting apparatus according to an exemplary embodiment of the present invention includes a backplate, a driving unit, a light guide plate, a frame, a bracket, a circuit board, a connector and a cable. The driving unit is attached to an outer surface of the backplate. The light guide plate is disposed on the inner side of the backplate. The frame is disposed at an outer periphery of the backplate and the light guide plate for fastening the backplate and the light guide plate thereto, and having an opening portion. The bracket is detachably coupled to the opening portion of the frame. The circuit board has a plurality of light sources, is disposed in a space between the frame and the light guide plate, and is replaceable in a sliding type through the opening portion of the frame when the bracket is decoupled from the frame. The connector has a female terminal attached to an end of the circuit board and a male terminal detachably coupled to the female terminal. The cable connects the driving unit and the circuit board to provide electric power of the driving unit to the circuit board.

For example, the bracket may have an insertion groove formed on an inner side thereof, into which the circuit board is inserted.

For example, a cable storage part may be formed on the inner side of the frame, for storing the cable.

For example, the cable storage part may be provided with a partition wall parallel to the backplate.

For example, the frame may include two protrusions for supporting the circuit board to be inserted in a sliding type.

For example, the frame may have a rectangular shape, and include a plurality of frame members corresponding to sides, each frame member being separably coupled to each other.

For example, the frame may further include a bridge having an L-shape and connecting the frame members.

For example, the bracket may be detachably coupled to the outer periphery of the bridge.

For example, the frame may have a cross-section of L-shape and the edge portion is pressed to increase the strength of the flat panel lighting apparatus.

According to the flat panel lighting apparatus of the present invention, a component of the lighting apparatus can be separated to replace the light source, so that easy maintenance and management can be expected. Further, in the replacement work of the lighting apparatus attached to the ceiling, the work process can be facilitated and the safety of the operator can be assured. In addition, it can be converted into various color temperatures, which can maximize esthetic effects such as color therapy.

Thereby contributing to the improvement of the economic efficiency of the product as well as the reliability of the product.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention

DETAILED DESCRIPTION OF THE ILLUSTRATED EMBODIMENTS

Figure 1:
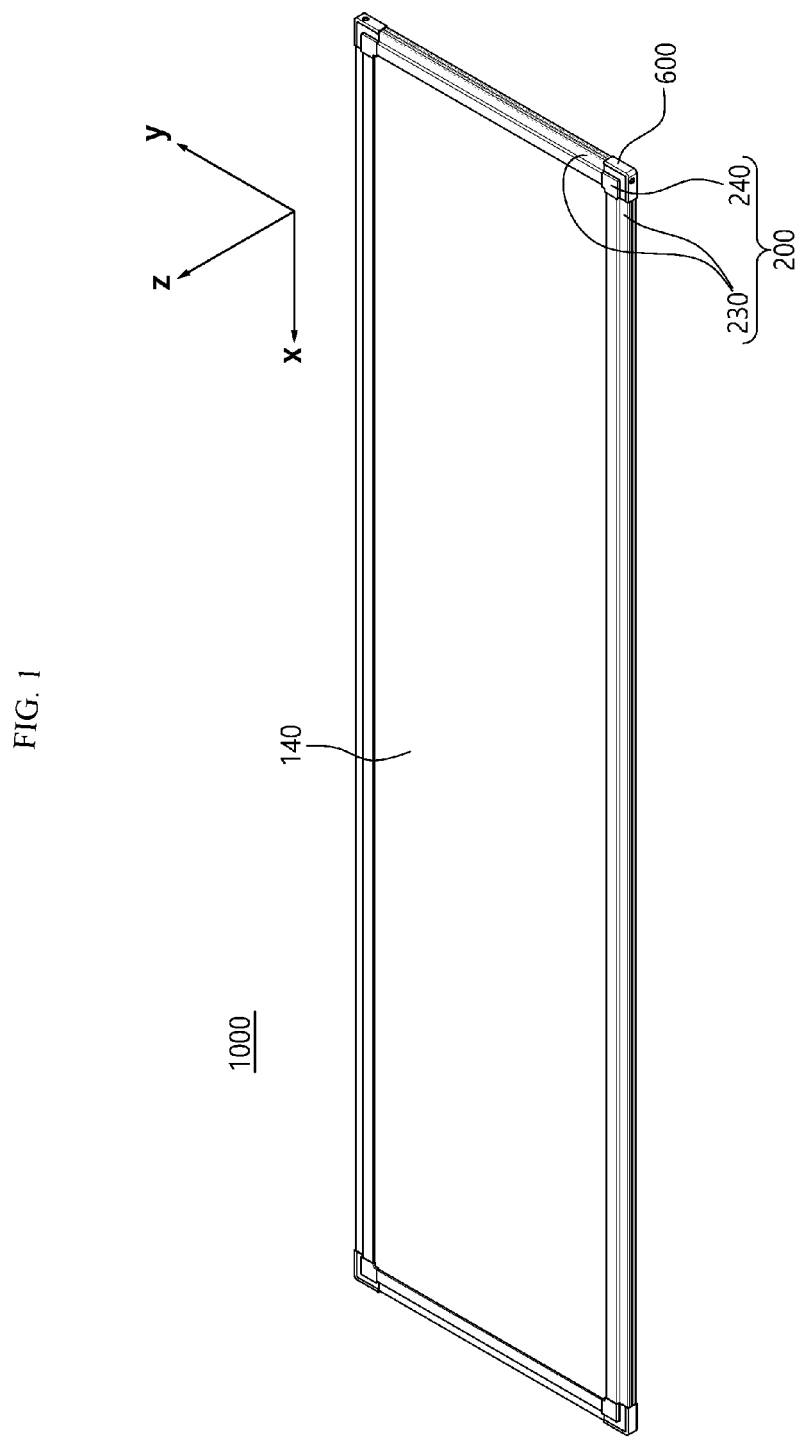
FIG. 1 is a perspective view illustrating a flat panel lighting apparatus according to an exemplary embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

Hereinafter, exemplary embodiments of the present invention will be described in detail with reference to the accompanying drawings.

Figure 2:
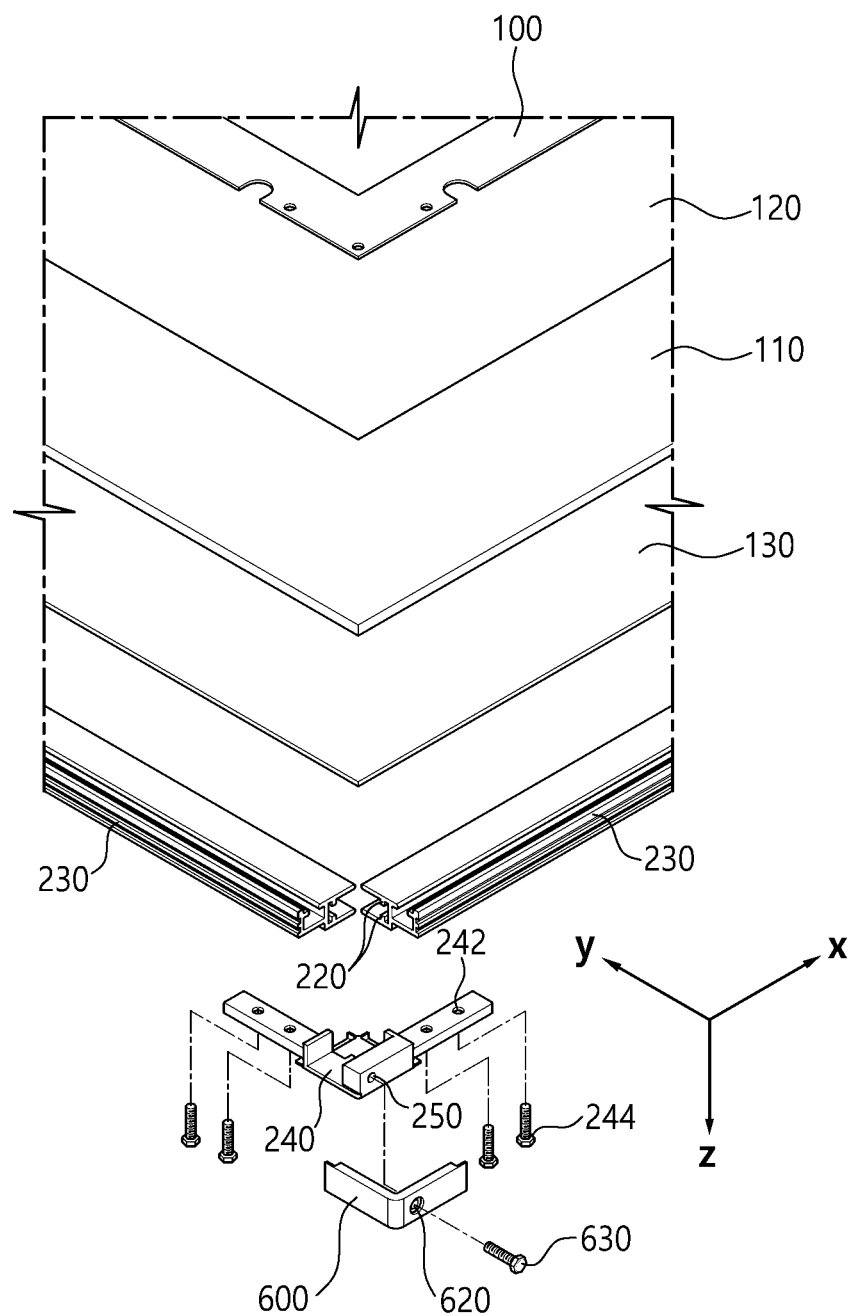
FIG. 2 is an exploded perspective view of a flat panel lighting apparatus according to an exemplary embodiment of the present invention.

FIG. 1 is a perspective view of a flat panel lighting apparatus according to an exemplary embodiment of the present invention, and FIG. 2 is an exploded perspective view of a flat panel lighting apparatus according to an exemplary embodiment of the present invention.

Referring to FIGS. 1 and 2, the flat panel lighting apparatus 1000 may include a backplate 100, a driving unit, a light guide plate 110, a frame 200, a circuit board 300, a connector 400, a cable 500 and a bracket 600. The driving unit may be attached to an outer surface of the backplate 100. The light guide plate 110 may be disposed on an inner surface of the backplate 100 opposite to the driving unit. The frame 200 may be formed at an outer edge of the backplate 100 and the light guide plate 110 to fix the backplate 100 and the light guide plate 110 thereto.

In addition, the frame 200 may have a structure in which one corner is opened as shown in FIG. 2. Therefore, the circuit board 300 can be easily taken out to the outside through the opened structure of the frame 200. In addition, the bracket 600 may be coupled to the open structure of the frame 200.

In addition, the circuit board 300 may include a plurality of light sources 310. At this time, the wavelength, the quantity of light, the color temperature, and the like of the light source 310 are not limited. In addition, various kinds of light sources 310 may be mixed and installed in the circuit board 300. In addition, the circuit board 300 may be disposed in a space between the frame 200 and the light guide plate 110.

Figure 4:
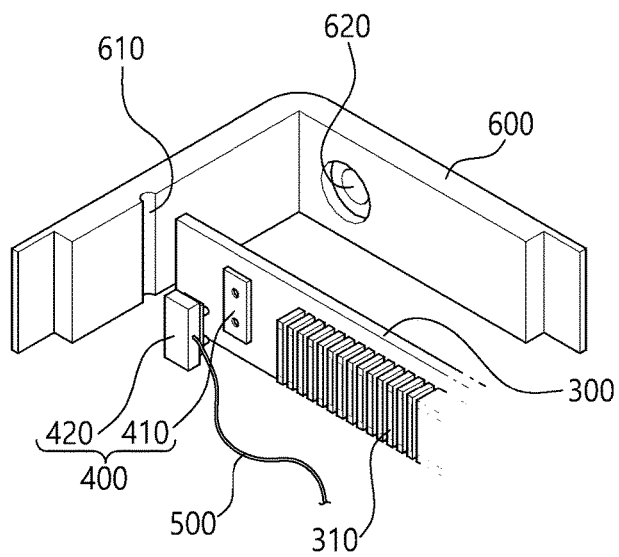
FIG. 4 is a view showing a connection structure of a bracket and a circuit board in FIGS. 1 and 2.

FIG. 4 is a view showing a coupling structure of the bracket 600, the circuit board 300, and the connector 400 of the flat panel lighting device 1000.

Referring to FIG. 4, an insertion groove 610 is formed on the inside of the bracket 600 so that the circuit board 300 can be inserted. Therefore, when the bracket 600 is detached from the frame 200, the circuit board 300 inserted into the insertion groove 610 of the bracket 600 can be detached from the frame 200 together.

A conventional circuit board of a conventional flat panel lighting device has a structure in which the cable is soldered to the circuit board. Therefore, the conventional flat panel lighting devices require soldering to replace the circuit board, so there is a cumbersome and safety problem for the operator. However, the flat panel lighting apparatus 1000 according to the present invention includes the connector 400 attached to the circuit board 300 so that the circuit board 300 can be easily separated from and connected to the cable 500.

The connector 400 includes a female terminal 410 and a male terminal 420. The male terminal 420 has a protruding shape, and may be inserted into and removed from the female terminal 410. The female terminal 410 may be formed at the end of the circuit board 300 and the male terminal 420 may be connected to the cable 500. The cable 500 and the circuit board 300 may be connected to each other through the female terminal 410 and the male terminal 420 of the connector 400. Therefore, the flat panel lighting apparatus 1000 according to the present invention can easily replace the circuit board 300 by separating the male terminal 420 from the female terminal 410, thereby providing convenience to the operator.

Referring to FIG. 2, the reflection plate 120, the light guide plate 110, and the diffusion plate 130 may be stacked on the backplate 100 in this order. The light efficiency can be improved by the reflection plate 120, the light guide plate 110, and the diffusion plate 130. However, since the reflection plate 120, the light guide plate 110, and the diffusion plate 130 are not structurally limited, the thickness and the material can be adjusted according to functions and applications. Further, another substrate or a thin film may be inserted between the reflection plate 120, the light guide plate 110, and the diffusion plate 130.

Figure 3:
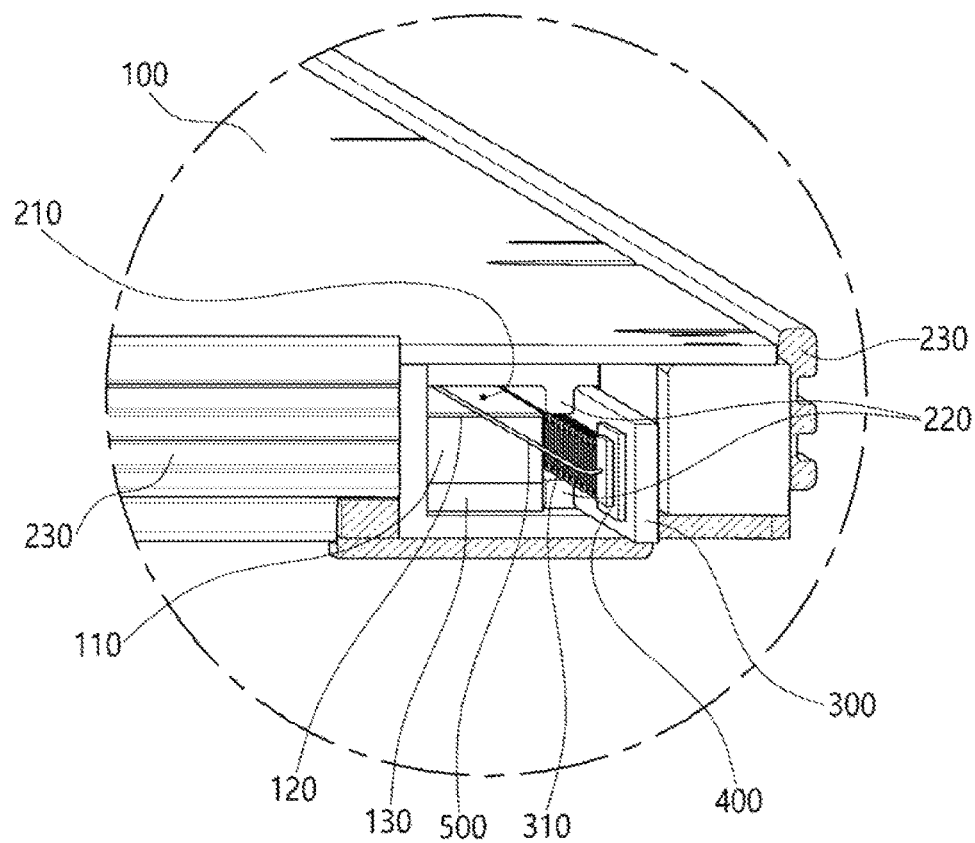
FIG. 3 is a cross-sectional view of the frame in FIGS. 1 and 2.

Referring to FIG. 3, the backplate 100, the reflection plate 120, the light guide plate 110, and the diffusion plate 130 may be fixed to the frame 200. The frame 200 may have a cross section of ⊂-shape to protect the backplate 100, the reflection plate 120, the light guide plate 110, and the diffusion plate 130. At this time, fasteners may be inserted into the holes formed in the backplate 100 and the frame 200, and the reflection plate 120, the light guide plate 110, and the diffusion plate 130 may be inserted into the frame 200. Therefore, the frame 200 can secure the structural strength and stability by fixing the backplate 100, the reflection plate 120, the light guide plate 110, and the diffusion plate 130.

Referring again to FIGS. 2, 3 and 4, the frame 200 may include a cable storage part 210 having a space formed between the light guide plate 110 and the backplate 100. In addition, the cable 500 with enough length may be stored in the cable storage part 210, in order to allow the circuit board 300 to be taken out to the outside. Therefore, it is possible to prevent the cable 500 from interfering with the path of light passing through the light guide plate 110. In addition, the cable storage part 210 may have a partition wall parallel to the backplate 100 to separate the light guide plate 110 from the cable 500.

In addition, the frame 200 may have two protrusions 220 on the inner wall to define a space for the circuit board 300. In addition, the circuit board 300 can be inserted into or removed from the space defined by the two protrusions 220 in the frame 200 in a sliding manner.

The frame 200 may have a rectangular structure and may include a plurality of frame members 230 constituting each side as shown in FIG. 2. The size of the frame 200 is not limited. The circuit board 300 with the light source 310 may be disposed correspondingly only to one side of each frame member 230, and may be disposed correspondingly to two or more sides as required. Each of the frame members 230 can be separated from each other or assembled with each other.

The frame 200 may further include a bridge 240 connecting the frame members 230. The bridge 240 has, for example, an L-shape and can be inserted into the end space of the frame members 230 on both sides. The bridge 240 may include a fixing hole 242 penetrating therethrough and a fixing member 244 inserted into the fixing hole 242. Accordingly, by fastening the fixing member 244 to the fixing hole 242, the connection of the frame members 230 can be firmly maintained.

In addition, the bracket 600 may be detachably coupled to the outside of the bridge 240. The bracket 600 may include an insertion groove 610 into which the circuit board 300 is inserted and a tightening hole 620 for being coupled with the bridge 240. The bridge 240 may also have a tightening hole 250 corresponding to the tightening hole 620 of the bracket 600. When a tightening member 630 is inserted into the tightening hole 620 of the bracket 600 and the tightening hole 250 of the bridge 240, the bracket 600 is coupled with the bridge 240. Therefore, in order to replace the circuit board 300 with the light source 310, the tightening member 630 is firstly pulled out, and the bracket 600 is moved along −X direction in FIG. 2. Then, the circuit board 300 inserted into the insertion groove 610 slides out from the frame 200. Therefore, the circuit board 300 can be easily replaced.

In addition, the frame 200 may have an edge portion pressed to have L-shape cross-section in order to increase the strength of the flat panel lighting apparatus 1000. Therefore, distortion of the leading flat panel lighting apparatus can be prevented, and the limitation of the enlargement can be overcome.

It will be apparent to those skilled in the art that various modifications and variation may be made in the present invention without departing from the spirit or scope of the invention. Thus, it is intended that the present invention cover the modifications and variations of this invention provided they come within the scope of the appended claims and their equivalents.

What is claimed is:

1. A flat panel lighting apparatus comprising
a backplate;
a driving unit attached to an outer surface of the backplate;
a light guide plate disposed on the inner side of the backplate;
a frame disposed at an outer periphery of the backplate and the light guide plate for fastening the backplate and the light guide plate thereto, and having an opening portion;
a bracket detachably coupled to the opening portion of the frame;
a circuit board having a plurality of light sources, being disposed in a space between the frame and the light guide plate, and being replaceable in a sliding type through the opening portion of the frame when the bracket is decoupled from the frame;
a connector having a female terminal attached to an end of the circuit board and a male terminal detachably coupled to the female terminal; and
a cable connecting the driving unit and the circuit board to provide electric power of the driving unit to the circuit board.

2. The flat panel lighting apparatus of claim 1, wherein the bracket has an insertion groove formed on an inner side thereof, into which the circuit board is inserted.

3. The flat panel lighting apparatus of claim 1, wherein a cable storage part is formed on the inner side of the frame, for storing the cable.

4. The flat panel lighting apparatus of claim 3, wherein the cable storage part is provided with a partition wall parallel to the backplate.

5. The flat panel lighting apparatus of claim 1, wherein the frame comprises two protrusions for supporting the circuit board to be inserted in a sliding type.

6. The flat panel lighting apparatus of claim 1, wherein the frame has a rectangular shape, and includes a plurality of frame members corresponding to sides, each frame member being separably coupled to each other.

7. The flat panel lighting apparatus of claim 6, wherein the frame further comprises a bridge having an L-shape and connecting the frame members.

8. The flat panel lighting apparatus of claim 7, wherein the bracket is detachably coupled to the outer periphery of the bridge.

9. The flat panel lighting apparatus of claim 1, wherein the frame has a cross-section of L-shape and the edge portion is pressed to increase the strength of the flat panel lighting apparatus.

\* \* \* \* \*